United States Patent
Antony

(10) Patent No.: US 9,639,386 B2
(45) Date of Patent: *May 2, 2017

(54) CENTRAL SWITCH FOR COUPLING VIRTUAL DESKTOPS TO PERIPHERAL DEVICES

(71) Applicant: VMware, Inc., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 14/532,653

(22) Filed: Nov. 4, 2014

(65) Prior Publication Data

US 2015/0058853 A1 Feb. 26, 2015

Related U.S. Application Data

(63) Continuation of application No. 12/629,132, filed on Dec. 2, 2009, now Pat. No. 8,886,708.

(51) Int. Cl.
*G06F 15/173* (2006.01)
*G06F 9/455* (2006.01)
*G06F 3/023* (2006.01)
*G06F 3/038* (2013.01)

(52) U.S. Cl.
CPC .......... *G06F 9/45533* (2013.01); *G06F 3/023* (2013.01); *G06F 3/038* (2013.01); *G06F 9/45558* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,223,202 B1 * | 4/2001 | Bayeh | G06F 9/5027 718/1 |
| 6,378,009 B1 * | 4/2002 | Pinkston, II | G06F 13/4022 710/105 |
| 8,886,708 B2 | 11/2014 | Antony | |
| 2003/0009559 A1 * | 1/2003 | Ikeda | H04L 29/06 709/225 |
| 2003/0061392 A1 | 3/2003 | Chang et al. | |
| 2003/0149787 A1 * | 8/2003 | Mangan | H04L 12/4641 709/238 |
| 2003/0172145 A1 * | 9/2003 | Nguyen | G06Q 10/10 709/223 |

(Continued)

*Primary Examiner* — Scott B Christensen

(57) ABSTRACT

In one embodiment, a method includes coupling a plurality of virtual machines to a plurality of peripheral devices via a central switch where the plurality of virtual machines are running a plurality of virtual desktops. A data packet is received from a virtual machine where the data packet is received in a first format compatible with a virtual desktop being run in the virtual machine. The central switch determines a peripheral device that corresponds to the virtual desktop. Then, the central switch generates a peripheral signal from the data packet that is configured to be sent to the peripheral device. The peripheral signal is in a second format compatible with the peripheral device and different from the first format. The peripheral signal is sent to the peripheral device where the peripheral device can process the peripheral signal for the virtual desktop being run in the virtual machine.

21 Claims, 7 Drawing Sheets

(56) References Cited

U.S. PATENT DOCUMENTS

| | | | | |
|---|---|---|---|---|
| 2004/0181590 A1* | 9/2004 | Liou | ............... | H04L 29/06027 |
| | | | | 709/217 |
| 2006/0203460 A1* | 9/2006 | Aviv | ............... | H05K 7/1492 |
| | | | | 361/788 |
| 2007/0022176 A1* | 1/2007 | Kobayashi | ............ | H04L 12/12 |
| | | | | 709/217 |
| 2007/0250649 A1* | 10/2007 | Hickey | ............... | G06F 13/385 |
| | | | | 710/62 |
| 2008/0005414 A1* | 1/2008 | Liu | ............... | G06F 3/023 |
| | | | | 710/62 |
| 2008/0168118 A1* | 7/2008 | Hickey | ............... | G06F 13/385 |
| | | | | 709/201 |
| 2008/0201479 A1* | 8/2008 | Husain | ............... | G06F 9/445 |
| | | | | 709/227 |
| 2008/0301340 A1* | 12/2008 | Stotz | ............... | G06F 9/5077 |
| | | | | 710/68 |

\* cited by examiner

CENTRAL SWITCH FOR COUPLING VIRTUAL DESKTOPS TO PERIPHERAL DEVICES

CROSS REFERENCE TO RELATED APPLICATIONS

The present disclosure is a continuation of U.S. patent application Ser. No. 12/629,132, entitled "CENTRALIZED COMPUTER NETWORK VIRTUALIZATION ENVIRONMENT", filed Dec. 2, 2009, the contents of which is incorporated herein by reference in its entirety.

BACKGROUND

A computer network virtualization environment (e.g., Virtual Desktop Infrastructure (VDI)) may utilize thin clients at the user-end to access virtual desktops associated with users. The virtual desktops may be displayed in virtual machines (VMs) that the users may communicate with through the thin clients. The virtual machines may reside on a host server to which a network switch may be coupled to.

Thin clients may be low-end desktop computers, which may merely be used to connect to the remote desktops through a remote desktop connection (e.g., Microsoft®'s Remote Desktop Protocol (RDP) connection) or a web interface. FIG. 1 shows a thin client based computer network virtualization environment 100. The computer network virtualization environment 100 may include a host server 102 on which a number of VMs $104_1 \ldots 104_N$ reside. The VMs $104_1 \ldots 104_N$ may be mapped to respective thin clients $110_1 \ldots 110_N$ through a connection manager 106. The connection manager 106 may be software-based.

The thin clients $110_1 \ldots 110_N$ may connect to the remote desktops through the computer network 108 (e.g., Internet, Local Area Network (LAN), Wide Area Network (WAN)). A remote desktop connection may be required for the purpose, as discussed above. There may be some latency associated with connecting to the remote desktops. Patch management may also be required at the thin client end as the thin clients $110_1 \ldots 110_N$ may include operating systems.

SUMMARY

Disclosed are a method, an apparatus, and a system to realize a centralized computer network virtualization environment using a central switch.

In one embodiment, a method includes coupling a plurality of virtual machines to a plurality of peripheral devices via a central switch where the plurality of virtual machines are running a plurality of virtual desktops. A data packet is received from a virtual machine in one of the plurality of virtual machines coupled to the central switch where the data packet is received in a first format compatible with a virtual desktop being run in the virtual machine. The central switch determines a peripheral device in the plurality of peripheral devices that corresponds to the virtual desktop. Then, the central switch generates a peripheral signal from the data packet that is configured to be sent to the peripheral device. The peripheral signal is in a second format compatible with the peripheral device and different from the first format. The peripheral signal is sent to the peripheral device where the peripheral device can process the peripheral signal for the virtual desktop being run in the virtual machine.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

DETAILED DESCRIPTION

Example embodiments, as described below, may be used to realize a centralized computer network virtualization environment through a central switch. Although the present embodiments have been described with reference to specific example embodiments, it will be evident that various modifications and changes may be made to these embodiments without departing from the broader spirit and scope of the various embodiments.

Figure 1:
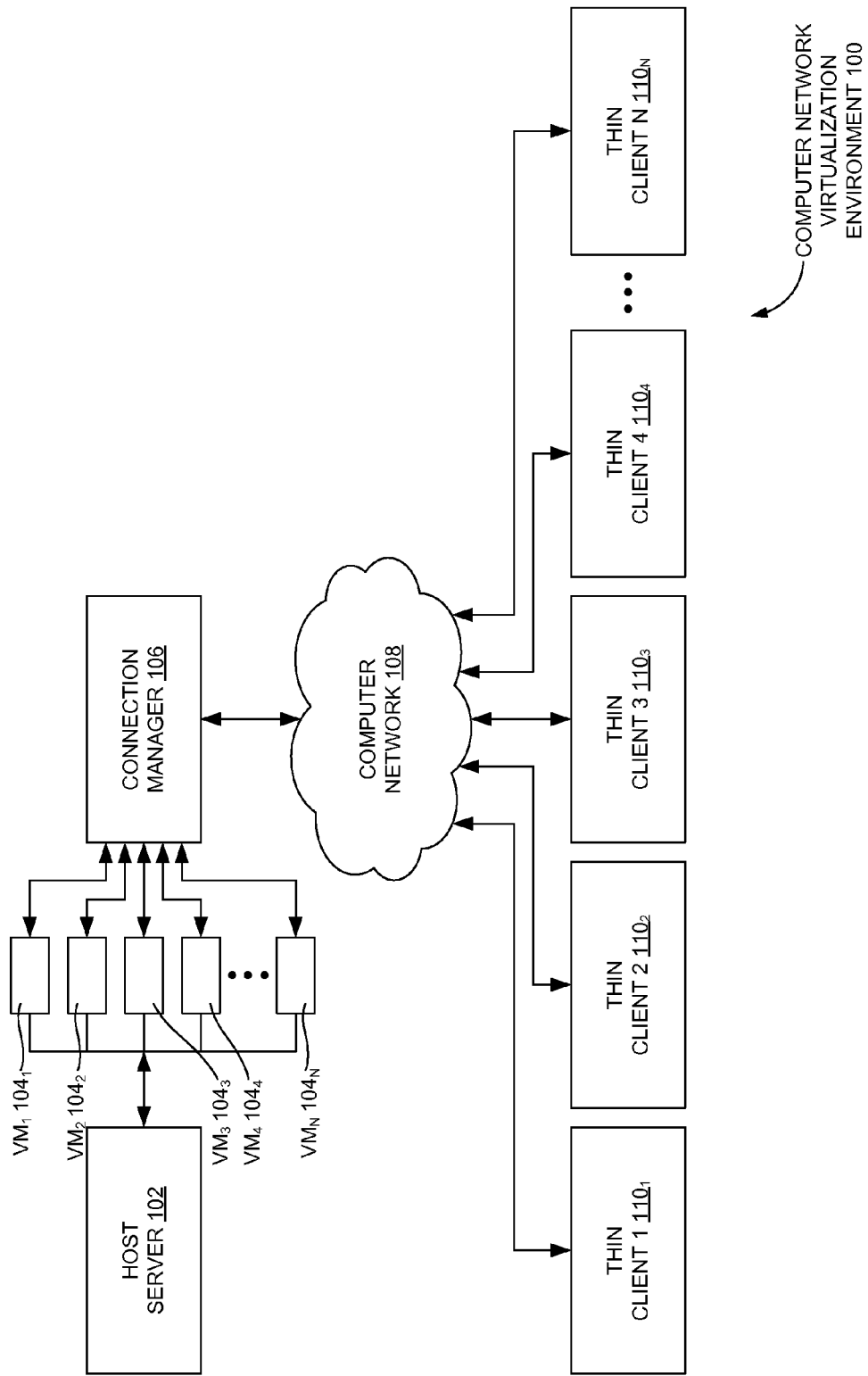
FIG. 1 is a system view of a thin client based computer network virtualization environment, according to one or more embodiments.
Figure 2:
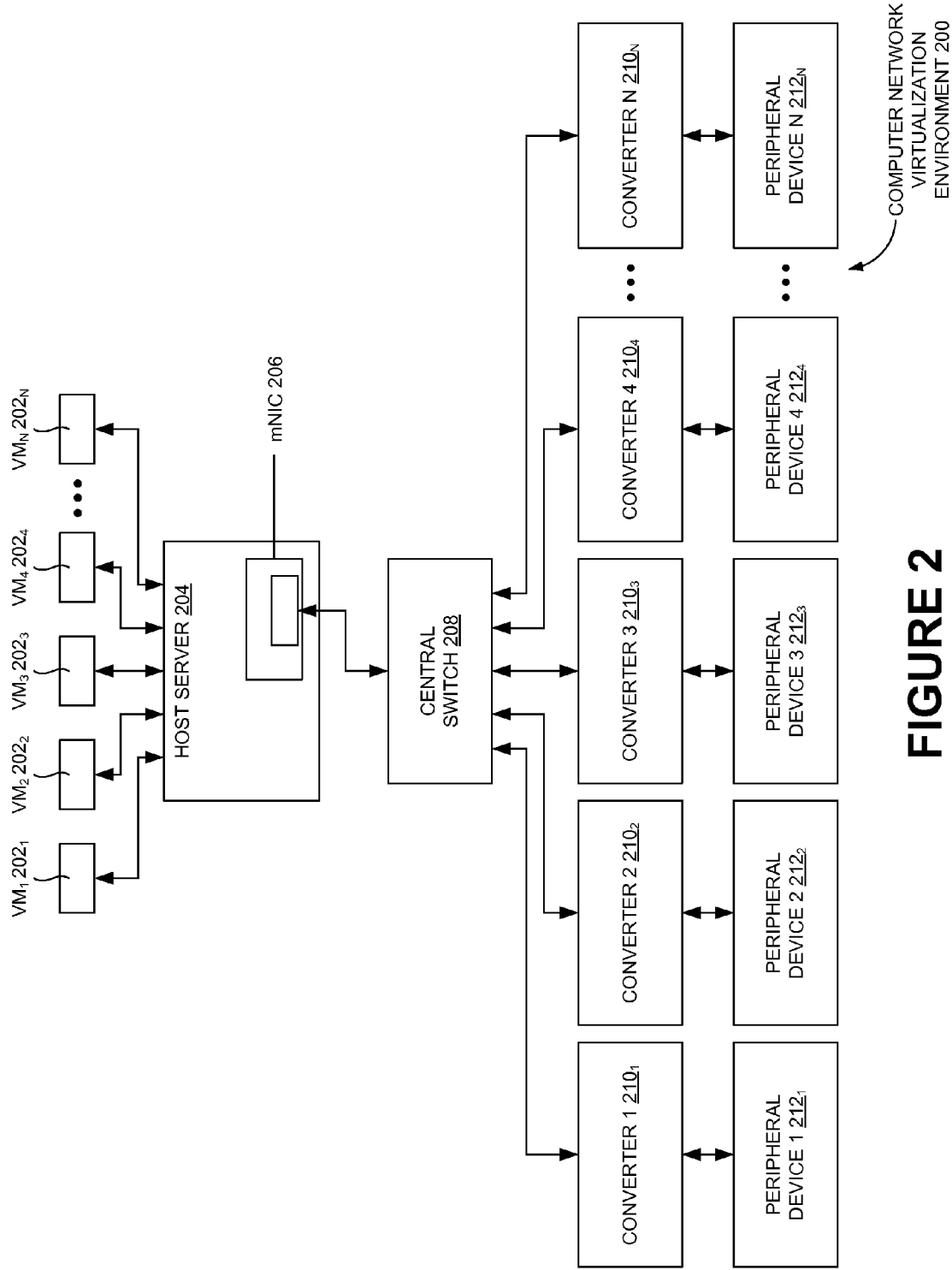
FIG. 2 is system view of a computer network virtualization environment, according to one or more embodiments.

FIG. 2 shows a computer network virtualization environment 200, according to one or more embodiments. In one or more embodiments, the computer network virtualization environment 200 may include a host server 204 configured to host a number of VMs ($202_1 \ldots 202_N$). In one or more embodiments, VMs $202_1 \ldots 202_N$ may be virtualized desktops associated with end users who may communicate exclusively with VMs $202_1 \ldots 202_N$ directly through the corresponding peripheral devices $212_1 \ldots 212_N$. For example, there may be a direct and exclusive communication between peripheral device $212_1$ and VM $202_1$, peripheral device $212_2$ and VM $202_2$, peripheral device $212_3$ and VM $202_3$, peripheral device $212_N$ and VM $202_N$ etc. In one or more embodiments, peripheral device $212_1 \ldots 212_N$ may each be a physical Keyboard, Video, Mouse (KVM), i.e., a physical keyboard, a physical video display unit (or computer monitor), and a physical mouse or any combination of a physical keyboard, a computer monitor, a physical mouse and any other IO unit/USB port that may be used by end user.

In one or more embodiments, communication between peripheral device $212_1 \ldots 212_N$ and a corresponding VM $202_1 \ldots 202_N$ may be accomplished through a central switch 208. In one or more embodiments, the central switch 208 may couple to a management network interface card (mNIC)

of the host server 204. In one or more embodiments, mNIC may be configured to assign an identification information (e.g., Media Access Control (MAC) address) to each of the VMs $202_1 \ldots 202_N$ on the host server 204. In one or more embodiments, the central switch 208 may not only perform the functions associated with a normal network switch but also may segregate packet data (e.g., display Internet Protocol (IP) packets) associated with each VM $202_1 \ldots 202_N$ and transmit the packet data to interfaces (e.g., ports) available on the central switch 208 that are configured to couple to converters $210_1 \ldots 210_N$ interfaced with the peripheral devices $212_1 \ldots 212_N$.

In one or more embodiments, converters $210_1 \ldots 210_N$ may each convert a peripheral signal generated from the packet data segregated by the central switch 208 to a format that may be recognizable by the peripheral devices $212_1 \ldots 212_N$. In one or more embodiments, the converters $210_1 \ldots 210_N$ may be a PS/2+video to CAT5 dongle, a PS/2+video CAT6 dongle, a Universal Serial Bus (USB)+video dongle, PS/2 dongle and/or a PS/2/USB+video cable to convenience compatibility with a number of peripheral devices $212_1 \ldots 212_N$ such as keyboards, computer monitors, mouse and other user end devices. In one or more embodiments, the central switch 208 may couple to the converters $210_1 \ldots 210_N$ through a Registered Jack (RJ) 45 interface. In one or more embodiments, the central switch 208 may also couple to the host server 204 through an RJ45 interface. In one or more embodiments, wireless coupling between the central switch 208, the host server 204 and/or the converters $210_1 \ldots 210_N$ may also be employed.

Figure 3:
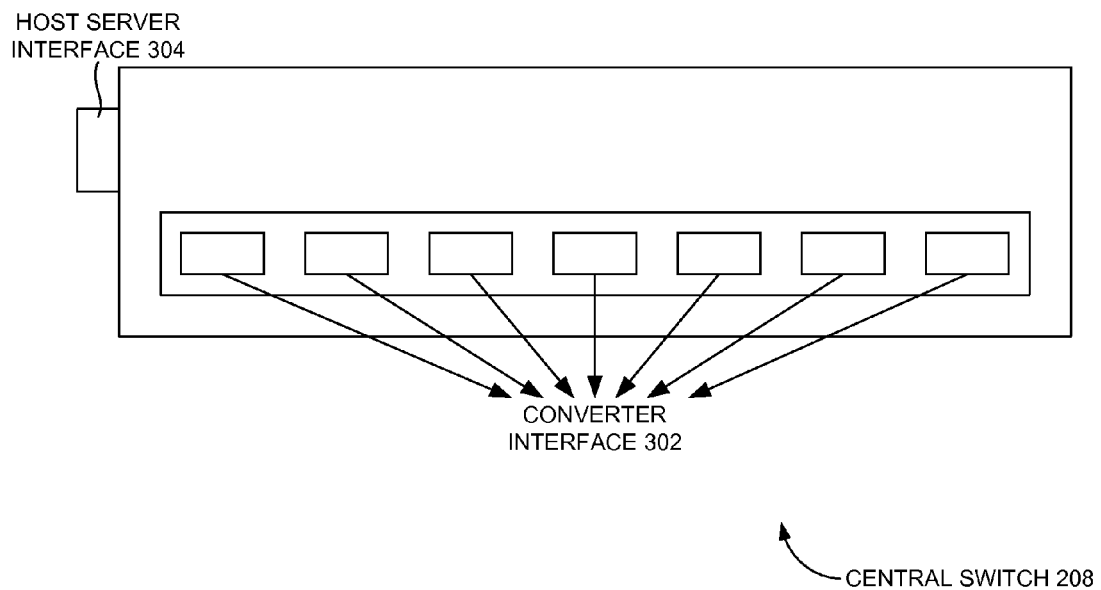
FIG. 3 is a schematic view of a central switch, according to one or more embodiments.

FIG. 3 shows a central switch 208, according to one or more embodiments. In one or more embodiments, the central switch 208 may include a converter interface 302 (e.g., RJ45 port) configured to be utilized in the coupling of the central switch 208 to the converters $210_1 \ldots 210_N$. In one or more embodiments, the converters $210_1 \ldots 210_N$ associated with individual peripheral devices $212_1 \ldots 212_N$ may be coupled to a corresponding converter interface 302 on the central switch 208. In one or more embodiments, the central switch 208 may also include a host server interface 304 (e.g., RJ45 interface) configured to couple to the host server 204. In one or more embodiments, one end of the central switch 208 may be configured to receive/transmit packet data (e.g., display IP packets) from/to the host server 204 and the other end may be configured to transmit/receive peripheral signals to/from the converters $210_1 \ldots 210_N$, as will be discussed below. In one or more embodiments, the peripheral signals may be compatible with the user-end converters $210_1 \ldots 210_N$, which may then convert the peripheral signals to a format compatible with the peripheral devices $212_1 \ldots 212_N$. For example, a PS/2 CAT5 dongle may convert peripheral signals to a format suitable to CAT5 cables.

In one or more embodiments, the central switch 208 may route a data associated with the direct and exclusive communication between a VM $202_1 \ldots 202_N$ and the host server 204. In one or more embodiments, the direct and exclusive communication between the VM $202_1 \ldots 202_N$ and the host server 204 may include transmitting the data from the host server 204 including the VM $202_1 \ldots 202_N$ to the corresponding peripheral device $212_1 \ldots 212_N$ and/or transmitting the data from the peripheral device $212_1 \ldots 212_N$ to the host server 204 including the VM $202_1 \ldots 202_N$.

Figure 4:
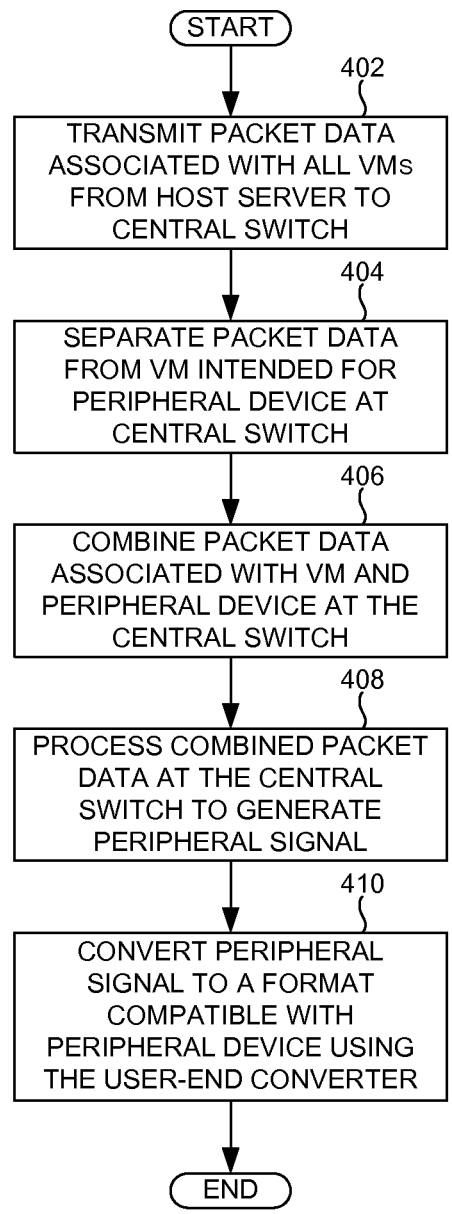
FIG. 4 is a flowchart detailing the operations involved in transmitting data from a host server including a virtual machine to a corresponding peripheral device, according to one or more embodiments.

FIG. 4 shows a flowchart detailing the operations involved in transmitting data from the host server 204 including the VM $202_1 \ldots 202_N$ to the corresponding peripheral device $212_1 \ldots 212_N$, according to one or more embodiments. In one or more embodiments, operation 402 may involve transmitting packet data associated with all VMs $202_1 \ldots 202_N$ from the host server 204 to the central switch 208. In one or more embodiments, the packet data may be, for example, Transmission Control Protocol/Internet Protocol (TCP/IP) packets. In one or more embodiments, operation 404 may involve separating the packet data from the VM $202_1 \ldots 202_N$ intended for the peripheral device $212_1 \ldots 212_N$ at the central switch 208 based on an identification data associated with the VM $202_1 \ldots 202_N$. In one or more embodiments, for example, a TCP port number may be utilized as the identification data associated with the VM $202_1 \ldots 202_N$. Therefore, the TCP/IP packets may be separated at the central switch 208 based on the TCP port number (compatible through the host server interface 304) associated with the VM $202_1 \ldots 202_N$.

In one or more embodiments, operation 406 may include combining the packet data associated with the communication between the VM $202_1 \ldots 202_N$ and the corresponding peripheral device $212_1 \ldots 212_N$ at the central switch 208. Therefore, the separated packet data associated with each VM $202_1 \ldots 202_N$ may be combined at the central switch 208. In one or more embodiments, operation 408 may include processing the combined packet data at the central switch 208 to generate a peripheral signal configured to be input to the appropriate converter $210_1 \ldots 210_N$. In one or more embodiments, the peripheral signal may be input to the appropriate converter $210_1 \ldots 210_N$ through the appropriate converter interface 302 (e.g., RJ45 interface). In one or more embodiments, the peripheral signal associated with the exclusive communication between the VM $202_1 \ldots 202_N$ and the corresponding peripheral device $212_1 \ldots 212_N$ may need to be converted to an appropriate format that is recognizable by the peripheral device $212_1 \ldots 212_N$.

Therefore, in one or more embodiments, operation 410 may involve converting the peripheral signal to a format compatible with the peripheral device $212_1 \ldots 212_N$ using the corresponding converter $210_1 \ldots 210_N$. In one or more embodiments, when an appropriate converter $210_1 \ldots 210_N$ is coupled to the converter interface 302, the peripheral signal may be converted to a format recognizable by the peripheral device $212_1 \ldots 212_N$ (e.g., keyboard, video, mouse).

Figure 5:
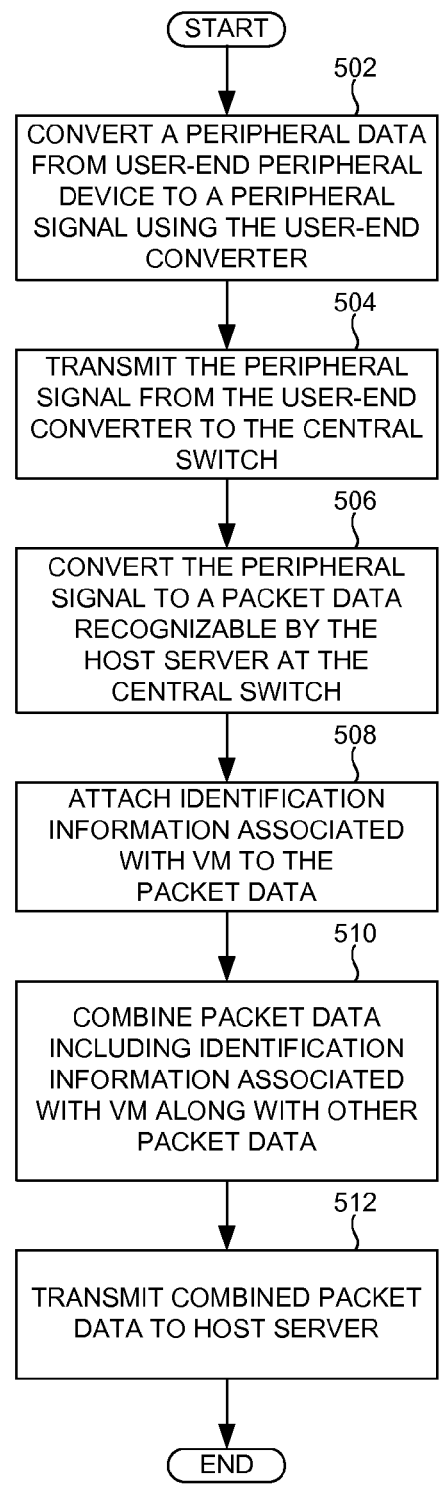
FIG. 5 is a flowchart detailing the operations involved in transmitting data from the peripheral device to the host server including the corresponding virtual machine, according to one or more embodiments.

FIG. 5 shows a flowchart detailing the operations involved in transmitting data from the peripheral device $212_1 \ldots 212_N$ to the host server 204 including the corresponding VM $202_1 \ldots $ VM $202_N$, according to one or more embodiments. In one or more embodiments, operation 502 may involve converting a peripheral data from the peripheral device $212_1 \ldots 212_N$ to a peripheral signal configured to be compatible with the converter interface 302 (e.g., RJ45 interface) of the central switch 208 using the appropriate converter $210_1 \ldots 210_N$. In one or more embodiments, operation 504 may involve transmitting the peripheral signal from the converter $210_1 \ldots 210_N$ to the central switch 208, i.e., through the converter interface 302 (e.g., RJ45 interface).

In one or more embodiments, operation 506 may involve converting the peripheral signal to a packet data (e.g., TCP/IP packets) recognizable by the host server 204 including the corresponding VM $202_1 \ldots 202_N$ at the central switch 208. In one or more embodiments, operation 508 may involve attaching an identification information associated with the appropriate VM $202_1 \ldots 202_N$ to the packet data recognizable by the host server 204 at the central switch 208. In one or more embodiments, the identification information may include, for example, a TCP/IP port number that is VM ($202_1 \ldots 202_N$) specific.

In one or more embodiments, operation 510 may involve combining, at the central switch 208, the packet data including the identification information associated with the appropriate VM $202_1 \ldots 202_N$ along with other packet data including corresponding VM ($202_1 \ldots 202_N$) specific identification information thereof. In one or more embodiments, operation 512 may then involve transmitting the combined packet data to the host server 204 including the number of VMs $202_1 \ldots 202_N$.

Therefore, in one or more embodiments, the abovementioned direct communication between a VM $202_1 \ldots 202_N$, which may be a virtualized desktop associated with a user, and a corresponding peripheral device $212_1 \ldots 212_N$ configured to be operated by the user may allow for dispensing with the need for a thin client at the user-end in a computer network virtualization environment 200. In one or more embodiments, the utilization of the central switch 208 may facilitate the users to access the virtualized desktops (VMs $202_1 \ldots 202_N$) without any non-peripheral device hardware at the user-end. In one or more embodiments, converters $210_1 \ldots 210_N$ may suffice at the user-end.

In one or more embodiments, the user-end requirement of booting the thin clients and connecting to the remote desktops using, for example, Microsoft®'s Remote Desktop Protocol (RDP) connection or a web interface may be dispensed with. In one or more embodiments, the central switch 208 may be utilized to seamlessly switch between VMs $202_1 \ldots 202_N$ and the corresponding peripheral devices $212_1 \ldots 212_N$.

Assuming a thin client based solution in a computer network virtualization environment where there are 24 users and 1 host server, 24 thin clients, along with 1 network switch, may be required. In one or more embodiments, assuming the same number of users in the computer network virtualization environment 200 shown in FIG. 2, the computer network virtualization environment 200 may merely require 24 user-end converters $210_1 \ldots 210_N$ (e.g., PS/2 CAT5 dongles), along with the central switch 208. In one or more embodiments, the user-end converters $210_1 \ldots 210_N$ may be more portable compared to the traditional thin clients. Additionally, in one or more embodiments, the lack of thin clients in the computer network virtualization environment 200 may provide for savings associated with hardware costs.

In one or more embodiments, the central switch 208 may be utilized, for example, in conjunction with TCP/IP switches in a computer network, depending on requirements thereof. In one or more embodiments, the lack of the need to connect to the remote desktop using, for example, Microsoft®'s RDP connection may provide for a real-time performance. In one or more embodiments, the end-user's experience may be similar to a native experience, i.e., the experience of directly working with a physical version of the remote desktop at the user-end.

In one or more embodiments, latency associated with connecting to the remote desktop using, for example, Microsoft®'s RDP connection in the case of a thin client based solution may be a non-issue in the computer network virtualization environment 200 of FIG. 2. In one or more embodiments, an end-user need to do patch management in a thin client based solution may also be a non-issue in the computer network virtualization environment 200 of FIG. 2. In one or more embodiments, the only user-end task required in the computer network virtualization environment 200 of FIG. 2 may be a conversion of a peripheral signal to a format recognizable by the peripheral devices $212_1 \ldots 212_N$, as described above.

In one or more embodiments, the central switch 208 may be compatible with existing network (e.g., Local Area Network (LAN)) infrastructure. In one or more embodiments, this may be because the central switch 208 may employ a standard converter interface 302 (e.g., RJ45 interface) and a host server interface 304 (e.g., RJ45 interface).

In one or more embodiments, the user-end processing required in traditional thin client based solutions may be shifted to the central switch 208 in the computer network virtualization environment 200 of FIG. 2. In one or more embodiments, up until the host server interface 304 of the central switch 208, data associated with the communication between the VMs $202_1 \ldots 202_N$ and the peripheral devices $212_1 \ldots 212_N$ may be in the form of standard TCP/IP packets, as discussed above. Therefore, in one or more embodiments, standard switching using the central switch 208 may suffice to manage the TCP/IP packets.

In one or more embodiments, the central switch 208 may separate packets from each VM $202_1 \ldots 202_N$ based on the peripheral device $212_1 \ldots 212_N$ (e.g., video packet, mouse packet, keyboard packet etc.). As described above, in one or more embodiments, packet data may have an associated port number in the TCP/IP stack. In one or more embodiments, packet data specific to VMs $202_1 \ldots 202_N$ may be segregated using the port number as the identification data. In one or more embodiments, therefore, the central switch 208 may perform additional functions as compared to standard network switches. Thus, in one or more embodiments, the central switch may be a KVM switch suitably adapted to the computer network virtualization environment 200 of FIG. 2.

In one or more embodiments, the additional functionality associated with the central switch 208 may pave the way for a centralized approach to desktop virtualization as the need for user-end hardware may be completely dispensed with. In one or more embodiments, the user-end maintenance requirements may be minimal in the computer network virtualization environment 200 of FIG. 2.

In one or more embodiments, the central switch 208 implementation may provide for improved security in the computer network virtualization environment 200 of FIG. 2. In one or more embodiments, a user may not be able to access the virtual desktop associated with another user because only data associated with the exclusive communication between the user-end peripheral device $212_1 \ldots 212_N$ and the VM $202_1 \ldots 202_N$ may be available to the user. In the case of a traditional thin client based solution, a user may receive packet data associated with another user (i.e., another virtual desktop), which may provide for lesser security compared to the computer network virtualization environment 200.

Figure 6:
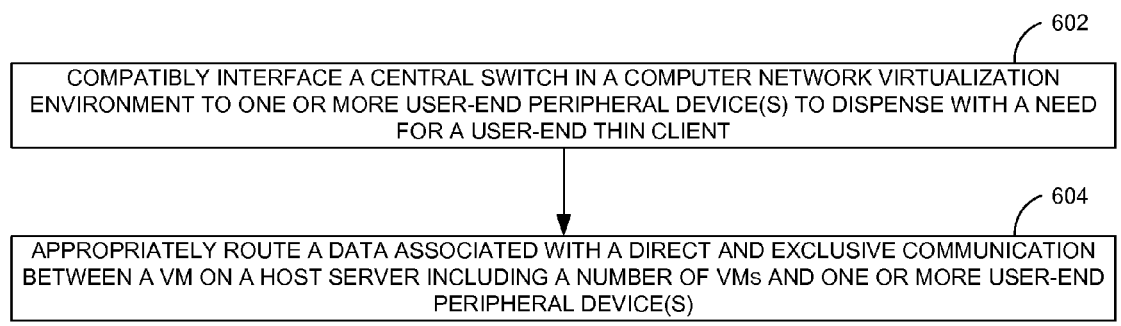
FIG. 6 is a process flow diagram detailing the operations involved in realizing a centralized computer network virtualization environment, according to one or more embodiments.

FIG. 6 shows a process flow diagram detailing the operations involved in realizing a centralized computer network virtualization environment 200, according to one or more embodiments. In one or more embodiments, operation 602 may involve compatibly interfacing a central switch 208 in the computer network virtualization environment 200 to one or more user-end peripheral device(s) $212_1 \ldots 212_N$ to dispense with a need for a user-end thin client. In one or more embodiments, the central switch 208 may be compatibly interfaced with the one or more user-end peripheral devices(s) $212_1 \ldots 212_N$ through the converter interface 302 (e.g., RJ45 interface) and the user-end converters $210_1 \ldots 210_N$.

In one or more embodiments, operation 604 may involve appropriately routing a data associated with the direct and exclusive communication between a VM $202_1 \ldots 202_N$ on a host server 204 including a number of VMs $202_1 \ldots 202_N$ and the one or more user-end peripheral device(s) $212_1 \ldots 212_N$ using the central switch 208.

Figure 7:
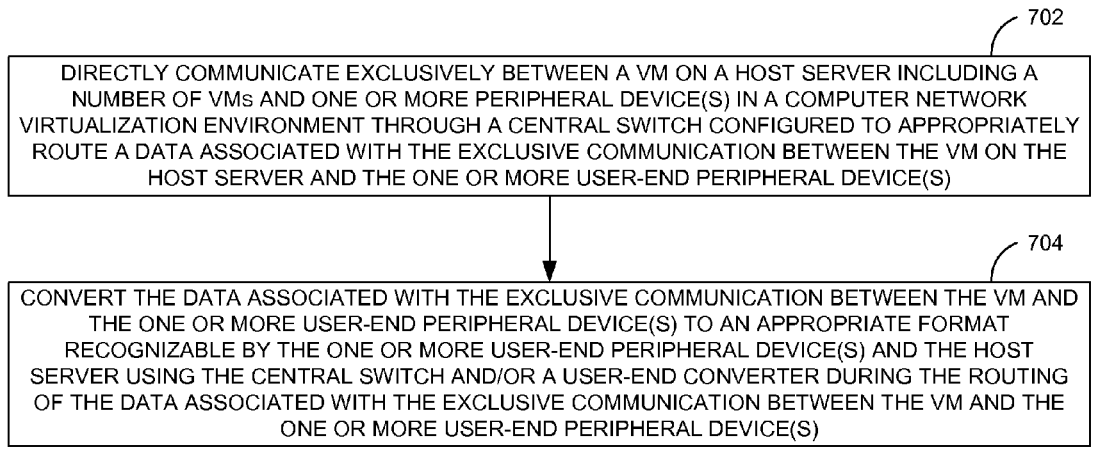
FIG. 7 is a process flow diagram detailing the operations involved in directly and exclusively communicating with an appropriate remote desktop from a user-end, according to one or more embodiments.

FIG. 7 shows a process flow diagram detailing the operations involved in directly and exclusively communicating with an appropriate remote desktop from a user-end, according to one or more embodiments. In one or more embodiments, operation 702 may involve directly communicating exclusively between a VM $202_1 \ldots 202_N$ on a host server 204 including a number of VMs $202_1 \ldots 202_N$ and one or more user-end peripheral device(s) $212_1 \ldots 212_N$ in a computer network virtualization environment 200 through a central switch 208. In one or more embodiments, the central switch 208 may be configured to appropriately route a data associated with the exclusive communication between the VM $202_1 \ldots 202_N$ on the host server 204 and the one or more user-end peripheral device(s) $212_1 \ldots 212_N$.

In one or more embodiments, operation 704 may involve converting the data associated with the exclusive communication between the VM $202_1 \ldots 202_N$ and the one or more user-end peripheral device(s) $212_1 \ldots 212_N$ to an appropriate format recognizable by the one or more user-end peripheral device(s) $212_1 \ldots 212_N$ and the host server 204 using the central switch 208 and/or a user-end converter $210_1 \ldots 210_N$ during the routing of the data associated with the exclusive communication between the VM $202_1 \ldots 202_N$ and the one or more user-end peripheral device(s) $210_1 \ldots 210_N$.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer device), and may be performed in any order (e.g., including using means for achieving the various operations). Accordingly, the specification and drawings are to be regarded in an illustrative rather than a restrictive sense.

What is claimed is:

1. A method for coupling a plurality of virtual machines to a plurality of peripheral devices via a central switch, wherein the plurality of virtual machines are running a plurality of virtual desktops, the method comprising:
receiving a data packet from a virtual machine in one of the plurality of virtual machines coupled to the central switch, the data packet received in a first format compatible with a virtual desktop being run in the virtual machine;
determining, by the central switch, a peripheral device in the plurality of peripheral devices that corresponds to the virtual desktop based on identification data associated with the virtual desktop including a port number specific to the virtual desktop, wherein each peripheral device of the plurality of peripheral devices is associated with a different virtual desktop;
generating, by the central switch, a peripheral signal from the data packet that is configured to be sent to the peripheral device; and
sending, by the central switch, the peripheral signal to the peripheral device via a converter, wherein the converter converts the peripheral signal to a second format compatible with the peripheral device that processes the peripheral signal for the virtual desktop being run in the virtual machine, and wherein each peripheral device in the plurality of peripheral devices is associated with a single different converter.

2. The method of claim 1, wherein:
the peripheral signal is in a third format is compatible with the converter.

3. The method of claim 2, wherein:
the converter is coupled to a each of the plurality of peripheral devices.

4. The method of claim 2, wherein the converter is a Keyboard, Video, Mouse (KVM) converter configured to convert the peripheral signal to at least one of a keyboard compatible signal, a video compatible signal, and a mouse compatible signal.

5. The method of claim 1, wherein determining the peripheral device comprises:
determining identification information for the virtual machine; and
determining the peripheral device that corresponds to the identification information.

6. The method of claim 1, wherein the peripheral device processes the peripheral signal without establishing a virtual desktop session with the virtual desktop via a connection using the first format.

7. The method of claim 1, further comprising:
receiving a peripheral signal from the peripheral device;
determining the virtual machine in the plurality of virtual machines that corresponds to the peripheral device;
generating a data packet from the peripheral signal for the virtual machine; and
sending the data packet to the virtual machine, the virtual machine processing the data packet for the virtual desktop being run in the virtual machine.

8. A non-transitory computer-readable storage medium containing instructions for coupling a plurality of virtual machines to a plurality of peripheral devices via a central switch, wherein the plurality of virtual machines are running a plurality of virtual desktops, and wherein the instructions, when executed, control the central switch to be configured for:
receiving a data packet from a virtual machine in one of the plurality of virtual machines coupled to the central switch, the data packet received in a first format compatible with a virtual desktop being run in the virtual machine;
determining, by the central switch, a peripheral device in the plurality of peripheral devices that corresponds to the virtual desktop based on identification data associated with the virtual desktop including a port number specific to the virtual desktop, wherein each peripheral device of the plurality of peripheral devices is associated with a different virtual desktop;
generating, by the central switch, a peripheral signal from the data packet that is configured to be sent to the peripheral device; and
sending, by the central switch, the peripheral signal to the peripheral device via a converter, wherein the converter converts the peripheral signal to a second format compatible with the peripheral device that processes the peripheral signal for the virtual desktop being run in the virtual machine, and wherein each peripheral device in the plurality of peripheral devices is associated with a single different converter.

9. The non-transitory computer-readable storage medium of claim 8, wherein:
the peripheral signal is in a third format is compatible with the converter.

10. The non-transitory computer-readable storage medium of claim 9, wherein:
the converter is coupled to a each of the plurality of peripheral devices.

11. The non-transitory computer-readable storage medium of claim 9, wherein the converter is a Keyboard, Video, Mouse (KVM) converter configured to convert the peripheral signal to at least one of a keyboard compatible signal, a video compatible signal, and a mouse compatible signal.

12. The non-transitory computer-readable storage medium of claim 8, wherein determining the peripheral device comprises:
determining identification information for the virtual machine; and
determining the peripheral device that corresponds to the identification information.

13. The non-transitory computer-readable storage medium of claim 8, wherein the peripheral device processes the peripheral signal without establishing a virtual desktop session with the virtual desktop via a connection using the first format.

14. The non-transitory computer-readable storage medium of claim 8, further configured for:
receiving a peripheral signal from the peripheral device;
determining the virtual machine in the plurality of virtual machines that corresponds to the peripheral device;
generating a data packet from the peripheral signal for the virtual machine; and
sending the data packet to the virtual machine, the virtual machine processing the data packet for the virtual desktop being run in the virtual machine.

15. A central switch for coupling a plurality of virtual machines to a plurality of peripheral devices via the central switch, wherein the plurality of virtual machines are running a plurality of virtual desktops, the central switch comprising:
one or more processors; and
a non-transitory computer-readable storage medium comprising instructions, that when executed, control the one or more processors to be configured for:
receiving a data packet from a virtual machine in one of the plurality of virtual machines coupled to the central switch, the data packet received in a first format compatible with a virtual desktop being run in the virtual machine;
determining, by the central switch, a peripheral device in the plurality of peripheral devices that corresponds to the virtual desktop based on identification data associated with the virtual desktop including a port number specific to the virtual desktop, wherein each peripheral device of the plurality of peripheral devices is associated with a different virtual desktop;
generating, by the central switch, a peripheral signal from the data packet that is configured to be sent to the peripheral device; and
sending, by the central switch, the peripheral signal to the peripheral device via a converter, wherein the converter converts the peripheral signal to a second format compatible with the peripheral device that processes the peripheral signal for the virtual desktop being run in the virtual machine, and wherein each peripheral device in the plurality of peripheral devices is associated with a single different converter.

16. The central switch of claim 15, wherein:
the peripheral signal is in a third format is compatible with the converter.

17. The central switch of claim 16, wherein:
the converter is coupled to a each of the plurality of peripheral devices.

18. The central switch of claim 16, wherein the converter is a Keyboard, Video, Mouse (KVM) converter configured to convert the peripheral signal to at least one of a keyboard compatible signal, a video compatible signal, and a mouse compatible signal.

19. The central switch of claim 15, wherein determining the peripheral device comprises:
determining identification information for the virtual machine; and
determining the peripheral device that corresponds to the identification information.

20. The central switch of claim 15, wherein the peripheral device processes the peripheral signal without establishing a virtual desktop session with the virtual desktop via a connection using the first format.

21. The central switch of claim 15, further configured for:
receiving a peripheral signal from the peripheral device;
determining the virtual machine in the plurality of virtual machines that corresponds to the peripheral device;
generating a data packet from the peripheral signal for the virtual machine; and
sending the data packet to the virtual machine, the virtual machine processing the data packet for the virtual desktop being run in the virtual machine.

* * * * *